(12) United States Patent
Dakua et al.

(10) Patent No.: US 10,380,230 B2
(45) Date of Patent: Aug. 13, 2019

(54) CONTENT EXTRACTION SYSTEM

(71) Applicant: eBay Inc., San Jose, CA (US)

(72) Inventors: Priyavrath Dakua, Bangalore (IN); Prajakta Belgundi, Bangalore (IN); Sharath Raghu, Bangalore (IN)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 15/988,996

(22) Filed: May 24, 2018

(65) Prior Publication Data

US 2018/0267943 A1  Sep. 20, 2018

Related U.S. Application Data

(63) Continuation of application No. 14/984,223, filed on Dec. 30, 2015, now abandoned.

(30) Foreign Application Priority Data

Jul. 8, 2015  (IN) .......................... 3488/CHE/2015

(51) Int. Cl.
| | |
|---|---|
| *G06F 3/00* | (2006.01) |
| *G06F 17/22* | (2006.01) |
| *G06F 17/27* | (2006.01) |
| *G06F 17/21* | (2006.01) |
| *G06F 3/0484* | (2013.01) |
| *G06Q 30/06* | (2012.01) |

(52) U.S. Cl.
CPC ...... *G06F 17/2247* (2013.01); *G06F 3/04842* (2013.01); *G06F 17/218* (2013.01); *G06F 17/278* (2013.01); *G06F 17/2795* (2013.01); *G06Q 30/0623* (2013.01)

(58) Field of Classification Search
CPC ............. G06F 17/2247; G06F 3/04842; G06F 17/218; G06F 17/278; G06F 17/2795; G06F 30/0623; G06Q 30/0623
See application file for complete search history.

(56) References Cited

U.S. PATENT DOCUMENTS

| | | | |
|---|---|---|---|
| 7,013,310 B2 | 3/2006 | Messing et al. | |
| 8,117,203 B2 | 2/2012 | Gazen et al. | |
| 8,264,502 B2 | 9/2012 | Wang et al. | |
| 9,773,182 B1 * | 9/2017 | Wolkerstorfer | ......... G06F 17/27 |
| 2002/0054090 A1 | 5/2002 | Silva et al. | |

(Continued)

FOREIGN PATENT DOCUMENTS

IN  3488/CHE/2015 A  1/2017

OTHER PUBLICATIONS

Applicant Initiated Interview Summary received for U.S. Appl. No. 14/984,223, dated Oct. 4, 2017, 3 pages.

(Continued)

*Primary Examiner* — Kyle R Stork
(74) *Attorney, Agent, or Firm* — SBMC

(57) ABSTRACT

A system includes a content extraction engine comprising at least one processor and configured to receive a content page including first product data for a target product, remove noise content from the content page, thereby generating a remainder content page, compare the remainder content page to a first synonym list to identify the first product data, the first synonym list including a first data field name, and provide the first product data as associated with the first data field name.

20 Claims, 9 Drawing Sheets

(56) References Cited

U.S. PATENT DOCUMENTS

| | | | |
|---|---|---|---|
| 2004/0054719 A1* | 3/2004 | Daigle | G06Q 10/107 |
| | | | 709/203 |
| 2008/0168096 A1* | 7/2008 | Daskal | G06Q 10/06 |
| 2013/0145255 A1 | 6/2013 | Zheng et al. | |
| 2013/0204867 A1 | 8/2013 | Lim et al. | |
| 2014/0156392 A1* | 6/2014 | Ouimet | G06Q 30/02 |
| | | | 705/14.49 |
| 2014/0372873 A1 | 12/2014 | Leung et al. | |
| 2015/0127430 A1* | 5/2015 | Hammer, III | G06Q 10/087 |
| | | | 705/7.35 |
| 2016/0188620 A1* | 6/2016 | Rangappa | H04L 67/02 |
| | | | 707/709 |
| 2017/0011015 A1 | 1/2017 | Dakua et al. | |

OTHER PUBLICATIONS

Final Office Action received for U.S. Appl. No. 14/984,223, dated Dec. 18, 2017, 14 pages.
Non-Final Office Action received for U.S. Appl. No. 14/984,223, dated Jun. 6, 2017, 12 pages.
Response to Final Office Action filed on Feb. 2, 2018 for U.S. Appl. No. 14/984,223, dated Dec. 18, 2017, 41 pages.
Response to Final Office Action filed on Feb. 19, 2018 for U.S. Appl. No. 14/984,223, dated Dec. 18, 2017, 25 pages.
Response to Non-Final Office Action filed on Oct. 17, 2017 for U.S. Appl. No. 14/984,223, dated Jun. 6, 2017, 13 pages.
"Non-Final Office Action", U.S. Appl. No. 14/984,223, dated Jul. 16, 2018, 13 pages.

* cited by examiner

CONTENT EXTRACTION SYSTEM

CROSS-REFERENCE TO RELATED APPLICATIONS

This application is a continuation of and claims priority to U.S. patent application Ser. No. 14/984,223, filed on Dec. 30, 2015, which claims priority under 35 USC 119 or 365 to India Application No. 3488/CHE/2015, filed Jul. 8, 2015, the disclosures of which are incorporated in their entirety.

TECHNICAL FIELD

Embodiments of the present disclosure relate generally to online content and, more particularly, but not by way of limitation, to a system and method for extracting product data from online content.

BACKGROUND

Some online content providers present product data to online users over the Internet. For example, some online content providers may offer products for sale to online consumers through an online publication system. Each product presented by the publication system may be presented to the online user through, for example, a web page displaying product details, product images, product review, and other associated information. These web pages are often transmitted to the online user in the form of, for example, Hypertext Markup Language (HTML) documents. The online user views the web pages through a web browser, which parses and interprets the HTML content and displays the web page to the online user. As such, the online user may view product data for products.

BRIEF DESCRIPTION OF THE DRAWINGS

Various ones of the appended drawings merely illustrate example embodiments of the present disclosure and cannot be considered as limiting its scope.

The headings provided herein are merely for convenience and do not necessarily affect the scope or meaning of the terms used. Like numbers in the Figures indicate like components.

DETAILED DESCRIPTION

Figure 1:
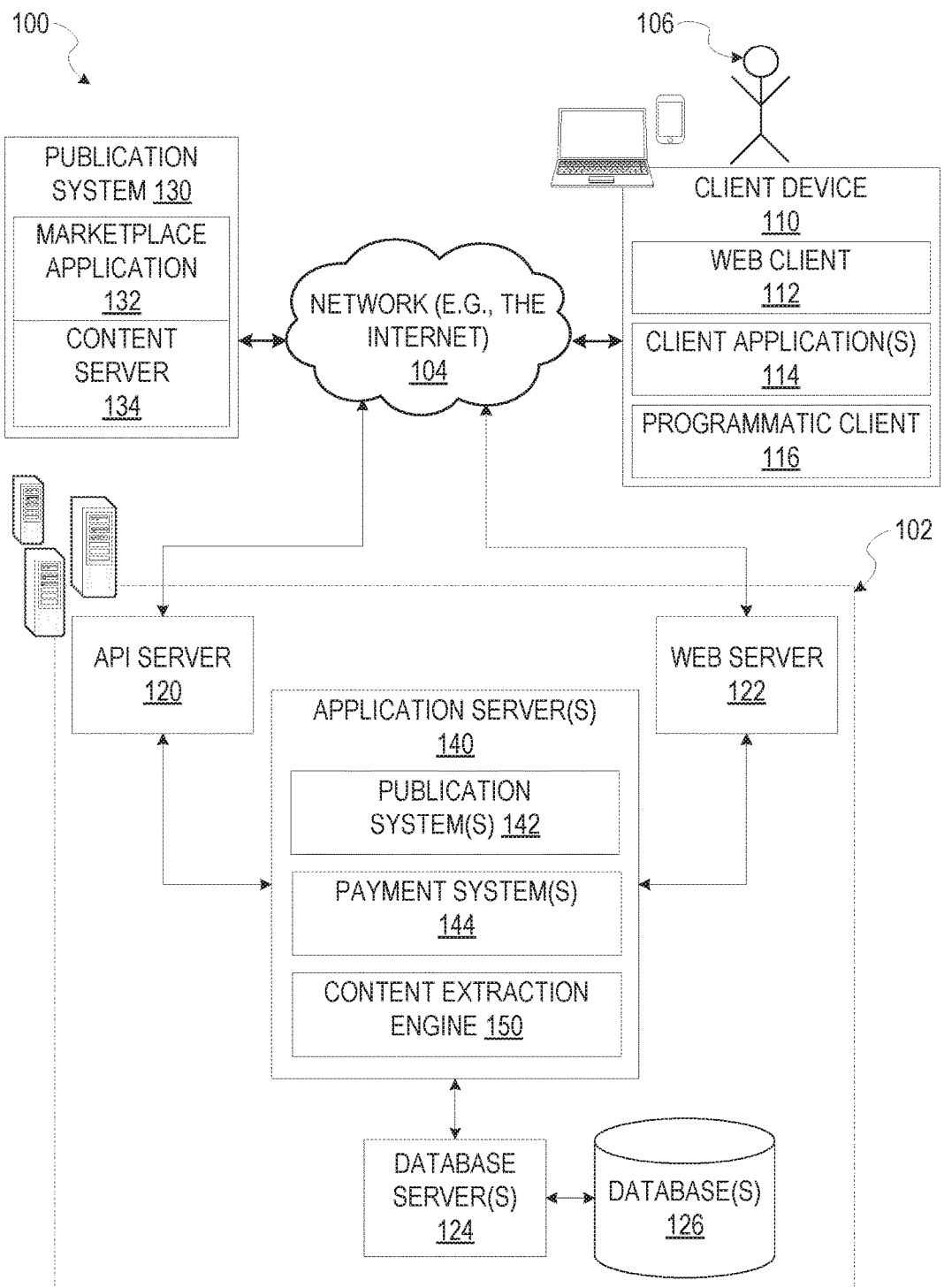
FIG. 1 illustrates a network diagram depicting an example content extraction system.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

A content extraction engine and associated systems and methods for content extraction are described herein. The content extraction system receives online content, or "content pages," within which product data is included. These content pages are provided by online content providers, such as an online e-commerce site that offers products for sale on the Internet. The content pages may include, for example, "listings pages" (e.g., the results of a search, in which many products are shown on a single page, often with only limited product data) or "product detail pages" (e.g., a content page dedicated to providing more extensive product data).

The content extraction engine analyzes the content page for a particular product and extracts product details, or "target product data", from the content page, such as, for example, product title, purchase price, shipping information (e.g., weight, size, cost), seller, etc. Further, some types of products may have different types of data of interest to consumers. For example, content pages for books may include author name, publication date, number of pages, ISBN number, publisher, etc., where content pages for home appliances may include manufacturer, brand name, model, dimensions, color, electrical information, etc.

In extracting product details from the content page, the content extraction engine analyses the "source code" of the content page (e.g., the HTML of the content page). More specifically, the content extract engine first extracts data not associated with the product (referred to herein as "noise content") from the content page. Many publication systems may format their content pages with a variety of sections or elements (e.g., HTML elements) that are unrelated to the particular product or products that are the main subject of the web page. For example, many content pages include sections such as a banner advertisement, a header area, or a menu bar across the top of the web page, or a navigation or search section along the left side of the web page, or advertisements or "shopping cart" functionality along the right side of the web page, or site information, legal information, or other footer information along the bottom of the web page. In other words, each of these sections are included in the content page, but are not primarily directed to providing product data for any particular product identified by the user (e.g., via a search, or via retrieving a product detail page). As such, the content extraction engine removes this "noise content" from the content page.

Once the noise content is removed from the content page, the content extraction system analyzes the rest of the content page for product data. More specifically, the content extraction system includes one or more "synonym lists," or lists of words that may be used to identify a particular type of data for the product. For example, a synonym list for a "product title" data type for products may include the set ("title", "product title", "name", "product name", "listing name", and so forth . . . ), and a synonym list for a "price" data type for products may include the set ("price", "offer price", "listing price", "cost", "charge", "priceblock_dealprice_row", and so forth . . . ). Many other synonym lists are possible for various product data, as are additional elements of each example synonym lists shown herein. The content extraction system analyzes the remaining content page (e.g., the remaining HTML elements), comparing the remaining content to each of the synonym lists in search of the product data. When a particular synonym list identifies an element (e.g., an element with "offer price" is located), the content extraction system identifies that element as a "price" data type, and subsequently extracts the price product data from the element, or from associated elements.

At least some of the technical problems that are addressed by the systems and methods described herein include: (a) higher processing requirements for examining content sections (e.g., during content extraction) that have no product data related to target products; (b) finding "false positives" or data elements on a web page that seem to be target product data but are not when, for example, noise sections happen to contain key terms; (c) difficulty in extracting content from content pages whose formats and data elements may vary (e.g., based on different product types, or different words or terms used to identify a common product feature); and (d) high manpower requirements for human-lead content extraction for content pages whose formats vary.

At least some of the technical benefits provided by the systems and methods described herein include: (a) reduced processing requirements by not performing content extraction on noise sections; (b) reducing network bandwidth requirements involved in querying the same content pages again by multiple users; (c) reducing false positives by not performing content extraction on noise sections; (d) automatically adjusting to differing formats for content pages; (e) automatically extracting product data from web pages; and (f) reducing the amount of analyst involvement in the content extraction process.

As used herein, the terms "target content" and "target product data" are used to refer to elements or data within the content page that contains information associated with one or more products ("target product(s)") that are the main focus or otherwise central to that content page (e.g., from the perspective of the requesting user). Target product data includes features, specifications, and attributes of the target product (e.g., information about the target product itself, such as product title and technical specifications), and may include listing information (e.g., sales data) about the subject product and associated listing(s) for the product (e.g., a sale price, a seller name, a seller rating, and so forth). Further, the terms "component of product data" and "product data component" are used herein to refer to a single data item of a target product, such as an author of a book, or a weight of a refrigerator. Each product data component may have a data type identifier, such as "author" or "weight," as well as possibly a value (e.g., as provided in the content page, and as determined by the content extraction engine described herein) such as "J. R. R. Tolkien" or "225 lbs." For example, a product details page for a particular target product may include target product data (e.g., "product data components") such as a sale price, a manufacturer of the product, dimensional data for the product, and warranty information for the product. For another example, a listings page (e.g., from a search query) may contain a listings section having target product data for several target products satisfying the search query. As such, the terms "target content section" and "target section" are used to refer to sections of target content within a content page in which target product data is present (e.g., HTML elements in which one or many target product data items appear).

The content page (e.g., product details page or listings page) may also contain many other extraneous content elements, such as advertisements, menus, cart management, header and footer sections, navigation sections, buttons, links, and other content not associated with the target product or products. As used herein, the terms "noise," "noise content," and "noise data" is used to refer to this extraneous content. For example, the content page may include an advertisement section that displays an ancillary product, or even an advertisement offering the product for sale from another content provider. However, because the advertisement content does not contain information related to the target product (e.g., information about the target product), the advertisement content is noise content. Further, the term "noise section" or "noise content section" is used to refer to sections of noise content. Continuing the example, the advertisement section is a noise section because the parent element containing the advertisement content includes no target product data.

FIG. 1 illustrates a network diagram depicting an example content extraction system 100. In the example embodiment, the content extraction system 100 includes a content extraction engine 150 that extracts product content from content pages provided by a publication system 130. The example publication system includes a marketplace application 132A that provides product content pages via a content server 134 (e.g., a Hypertext Transfer Protocol (HTTP) server) via a computer network 104 such as the Internet.

A networked system 102 provides network-based, server-side functionality, via the network 104 (e.g., the Internet or Wide Area Network (WAN)), to one or more client devices 110 of a user 106 that may be used, for example, by sellers or buyers (not separately shown) of products and services offered for sale through a publication system 142 (e.g., a marketplace system). FIG. 1 further illustrates, for example, one or both of a web client 112 (e.g., a web browser), client application(s) 114, and a programmatic client 116 executing on client device 110.

Each of the client devices 110 comprises a computing device that includes at least a display and communication capabilities with the network 104 to access the networked system 102. The client device 110 includes devices such as, but not limited to, work stations, computers, general purpose computers, Internet appliances, hand-held devices, wireless devices, portable devices, wearable computers, cellular or mobile phones, portable digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. Each of the client devices 110 connects with the network 104 via a wired or wireless connection. For example, one or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Each of the client devices 110 includes one or more applications (also referred to as "apps") 114 such as, but not limited to, a web browser, messaging application, electronic mail (email) application, an e-commerce site application (also referred to as a marketplace application), and the like. In some embodiments, if the e-commerce site application is included in a given one of the client devices 110, then this application is configured to locally provide the user interface and at least some of the functionalities with the application configured to communicate with the networked system 102, on an as needed basis, for data or processing capabilities not locally available (e.g., such as access to a database of items available for sale, to authenticate a user, to verify a method of payment). Conversely, if the e-commerce site application is not included in a given one of the client devices 110, the given one of the client devices 110 may use its web client 112 to access the e-commerce site (or a variant thereof) hosted on the networked system 102. Although only one client device 110 is shown in FIG. 1, two or more client devices 110 may be included in the content extraction system 100.

An Application Program Interface (API) server 120 and a web server 122 are coupled to, and provide programmatic and web interfaces respectively to, one or more application servers 140. In the example embodiment, the application servers 140 host the content extraction engine 150 that facilitates content extraction from product pages, as described herein. The application servers 140 are, in turn, shown to be coupled to one or more database servers 124 that facilitate access to one or more databases 126.

In some embodiments, the application servers 140 host one or more publication systems 142 and payment systems 144. The publication system 142, may provide a number of e-commerce functions and services to users that access networked system 102 and/or external sites 130. E-commerce functions/services may include a number of publisher functions and services (e.g., search, listing, content viewing, payment, etc.). For example, the publication system 142 may provide a number of services and functions to users for listing goods and/or services or offers for goods or services for sale, searching for goods and services, facilitating transactions, and reviewing and providing feedback about transactions and associated users. Additionally, the publication system 142 may track and store data and metadata relating to listings, transactions, and user interactions. In some embodiments, the publication system 142 may publish or otherwise provide access to content items stored in application servers 140 or databases 126 accessible to the application servers 140 or the database servers 124. The payment system 144 may likewise provide a number of payment services and functions to users. The payment system 144 may allow users to accumulate value (e.g., in a commercial currency, such as the U.S. dollar, or a proprietary currency, such as "points") in accounts, and then later to redeem the accumulated value for products or items (e.g., goods or services) that are made available via the publication system 142. While the publication system 142 and payment system 144 are shown in FIG. 1 to both form part of the networked system 102, it will be appreciated that, in alternative embodiments, the payment system 144 may form part of a payment service that is separate and distinct from the networked system 102. In other embodiments, the payment system 144 may be omitted from the content extraction system 100. In some embodiments, at least a portion of the publication system 142 may be provided on the client devices 110.

Further, while the content extraction system 100 shown in FIG. 1 employs a client-server architecture, embodiments of the present disclosure are not limited to such an architecture, and may equally well find application in, for example, a distributed or peer-to-peer architecture system. The various publication and payment systems 142 and 144 may also be implemented as standalone software programs, which do not necessarily have networking capabilities.

The client devices 110 access the various publication and payment systems 142 and 144 via the web interface supported by the web server 122. Similarly, the programmatic client 116 accesses the various services and functions provided by the publication and payment systems 142 and 144 via the programmatic interface provided by the API server 120. The programmatic client 116 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 116 and the networked system 102.

In the example embodiment, the content extraction engine 150 receives product content pages from the publication system 130 (e.g., via an HTTP request to the content server 134). In some embodiments, the user 106 interacts with the content extraction engine 150 to, for example, provide product content pages to the content extraction engine 150, or to identify noise sections via a graphical user interface (GUI) as described below. The content extraction engine 150 extracts noise sections or elements from the content pages and target data (e.g., product data in the form of a data value for a product data field, such as the value "$5.99" for a price field) in a process described in greater detail below.

Figure 2:
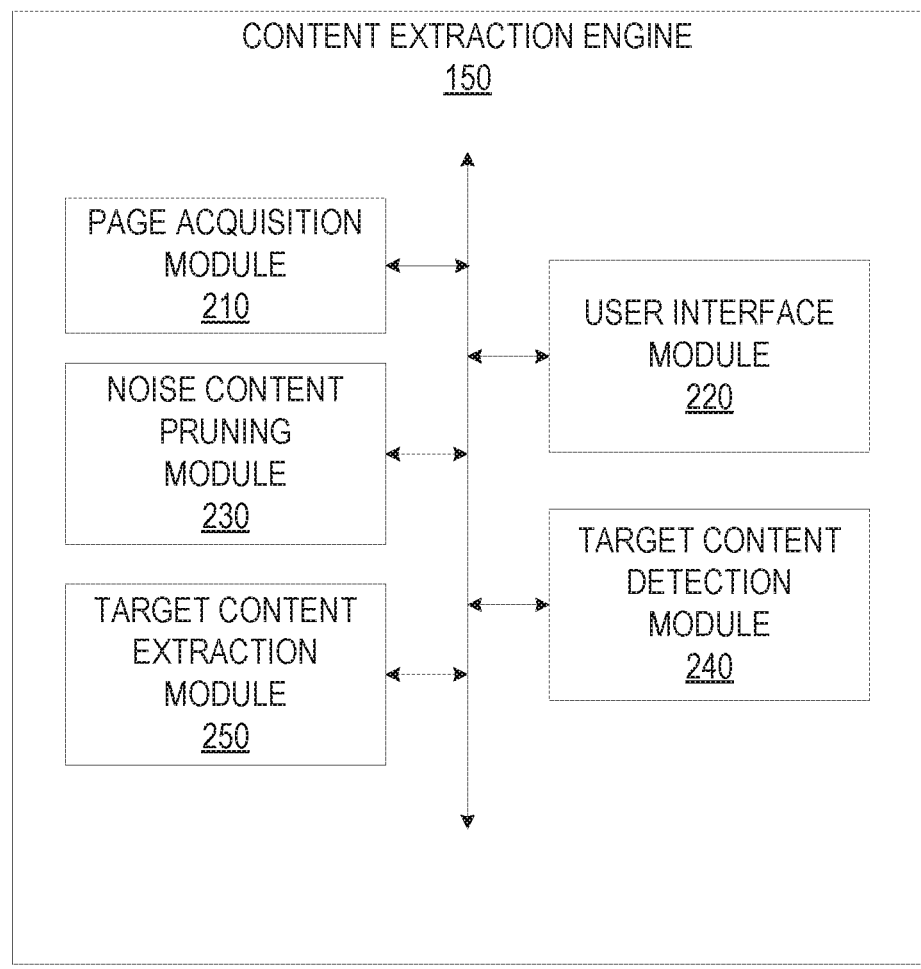
FIG. 2 is a block diagram showing components provided within the content extraction engine according to some embodiments.

FIG. 2 is a block diagram showing components provided within the content extraction engine 150 according to some embodiments. The content extraction engine 150 may be hosted on dedicated or shared server machines (not shown) that are communicatively coupled to enable communications between server machines. The components themselves are communicatively coupled (e.g., via appropriate interfaces) to each other and to various data sources, so as to allow information to be passed between the applications or so as to allow the applications to share and access common data. Furthermore, the components may access one or more databases 126 via the database servers 124 (both shown in FIG. 1).

The content extraction engine 150 performs various functionalities in order to effect content extraction from content pages. Each of these functionalities, in the example embodiment, is performed by one or more of the modules shown in FIG. 2. More specifically, the content extraction engine 150 includes a page acquisition module 210, a user interface module 220, a noise content pruning module 230, a target content detection module 240, and a target content extraction module 250.

The page acquisition module 210 identifies content pages for processing. In some embodiments, the content pages are received or retrieved from publication systems 130. For example, the page acquisition module 210 transmits HTTP requests to the content server 134 and receives a content page in response (e.g., a listings page or a product detail page). Examples of content pages are shown and described below in reference to FIGS. 3 and 4. In other embodiments, the user 106 provides the content page to the page acquisition module 210. For example, the user 106 may interact with the user interface module 220, retrieve a products page via the Internet (e.g., using a browser), and provide that content page to the page acquisition module 210.

The user interface module 220 enables the user 106 to interact with the content extraction engine 150. For example, as mentioned above, the user 106 may identify content pages for the page acquisition module 210, such as by providing a uniform resource locator (URL) of the content page on the Internet. In some embodiments, the user interface module 220 presents or displays the content page to the user 106, and the user 106 identifies noise sections or elements, or target content sections or elements through the user interface module 220. For example, the user 106 may select one or more sections or elements on the rendered content page display and identify those sections as noise sections, or sections to be removed from the content page or otherwise ignored during target content detection and other processing.

In some embodiments, the user interface module 220 visually identifies various sections of the content page to the user 106, such as through highlighting components of the structure or framing of the dominant elements of the content page. In some embodiments, the user interface module 220 analyzes the HTML elements of the content page and identifies "dominant elements" such as, for example, header and footer sections, advertisement sections, menu sections, navigation sections, listings results sections, product details sections, and cart sections. These types of sections often dominate portions or areas of a content page (e.g., when rendered by a web browser).

In some embodiments, the user interface module 220 analyzes elements to determine a portion (e.g., percentage) of display space consumed by the element and, if the portion exceeds a pre-determined threshold, such as 10%, then the element may be identified as a dominant element. In other embodiments, the user interface module 220 uses synonym lists to identify dominant sections. For example, advertisement sections often contain key words such as "ad" or "advertisement" or "advertising", such as in the tag elements of the HTML element, or within the internal content of the element itself. Further, some sections such as footers, headers, and other sections may be tagged as such (e.g., terms such as "header", "menu", "nav", for example, in the Document Object Model (DOM) of the page). The user interface module 220 may include a synonym list for each of the various types of sections, and if any of the words within a particular synonym list are detected with the element, that element may be identified as a dominant section.

Once the dominant sections are identified, the user interface module 220 highlights these dominant sections to the user 106. For example, in some embodiments, the dominant sections may be displayed with a lined frame around the section, or colored differently than other sections. As such, the user interface module 220 further enables the user 106 to select one or more sections for identification as a noise section. The noise content pruning module 230 subsequently removes these user-identified noise sections from the content page.

In the example embodiment, the noise content pruning module 230 analyzes the content page and automatically detects or determines noise sections or noise elements within the content page. More specifically, the content extraction engine 150 includes one or more synonym lists used for the identification of noise sections or noise elements. As used herein, the term "synonym list" refers to a set of words or phrases related to each other in some way (e.g., as synonyms). The content extraction engine 150 includes "noise synonym lists" for a variety of types of sections that commonly appear on product content pages (e.g., banner advertisement sections, menu sections, navigation sections, footer sections, and so forth), where the terms within the synonym list represent terms commonly appearing in those types of noise sections (e.g., in an HTML tag, or in an HTML element). For example, a synonym list for identification of ads sections may include the member terms {"ad", "advertisement", "advertising"}. For another example, a synonym list for identification of footer sections may include the member terms {"contact", "legal", "privacy notice", "conditions of use", "returns", "advertise", "careers", "download app", "sitemap", "contactus", "FAQ", "connect with us", "need help"}. For yet another example, a synonym list for identification of a top menu may include the member terms {"customer service", "contact us", "todays deals", "shop by department", "sign in", "help", "track order", "all categories", "download app"}.

In the example embodiment, the noise content pruning module 230 analyzes the content page with respect to each of the noise synonym lists. Each section or element that is matched to a particular synonym list causes that section to be identified as the respective type of section or element. In other words, and for example, matching on a term in the ads synonym list causes that section or element to be flagged as an ads section, which is a type of noise section. To perform this analysis, the noise content pruning module 230 may compare these synonym lists to sections or elements of the content page. In some embodiments, this comparison may be performed to HTML of the content page. In other embodiments, this comparison may be performed to the DOM of the content page. As such, the noise content pruning module 230 may identify multiple noise sections from the content page, thereby effectively identifying any sub-elements of that noise section or element as noise content.

In some embodiments, any occurrence of one or more of the terms of a synonym list within a section causes that section to be flagged as a noise section. In other embodiments, a pre-determined number of occurrences of any of the terms of a synonym list within the section causes that section to be flagged as a noise section.

Once noise sections or elements are identified, the content pruning module 230 removes or otherwise excludes those noise sections from further consideration. In the example embodiment, the content pruning module 230 edits the contents of the content page, removing the noise sections or elements and all of their child components or elements.

Once the identified noise content is removed from the content page, the target content detection module 240 processes the edited or "filtered" content page (continued to be referred to as just "the content page") for detection of target product data. More specifically, the content extraction engine 150 includes several "target content synonym lists" that are used to identify target content within the content page. Each target content synonym list includes a set of terms, or keys, commonly used to refer to a particular type of product data. Example types of product data are sale price, manufacturer, seller, publisher, part number, product dimensions, product image, etc., each of which may have its own synonym list. The content extraction engine 150 may, for example, include a synonym list for "manufacturer" product data that includes the set of terms {"manufacturer", "mfg", "maker", "fabricator", "company", "brand", "brand name"}. Other example synonym lists for various product data are possible such as, for example:

TABLE 1

Example Target Content Synonym Lists

| Type of Product Data | Synonym List (keys) |
|---|---|
| Price | {"price", "offer price", "listing price", "cost", "charge", "priceblock_dealprice_row"} |

TABLE 1-continued

Example Target Content Synonym Lists

| Type of Product Data | Synonym List (keys) |
|---|---|
| Specifications | {"specs", "product-detail", "item-specs", "spec-body", "pdt-info"} |
| Title | {"title", "product title", "name", "product name", "listing name"} |
| Shipping | {"shipping", "pdt-shipping", "ship-cost", "ship-price"} |
| Items In Stock | {"availability", "stock", "instock"} |
| Customer Rating | {"pdt-rating", "rating", "review-rating", "averageCustomerReviews"} |
| Seller Name | {"merchant-info", "seller-name", "sold-by", "seller-info"} |

As mentioned above, these synonym lists may include more or less synonyms than listed, and many other types of product data may have an associated synonym list that includes synonyms (e.g., used in web pages) for identifying a particular type of product data.

Some synonym lists and sets of synonym lists may be associated with a particular type or class of product. For example, a books class of products often have different types of product data (e.g., product details) than consumer appliances class of products. Product details for books may include, for example, author, publisher, first publication date, number of pages, ISBN number, and the like, where a refrigerator may include product details such as weight, height, width, and depth dimensions, electrical requirements, internal size, color, model number, and the like. As such, in some embodiments, the content extraction engine 150 identifies a set of synonym lists for each type, category, or class of product. For example, a "book" set of synonym lists may include an "authors" synonym list, a "pages" synonym list, a "publisher" synonym list, and so forth, where a "refrigerator appliances" set of synonym lists may include a "manufacturers" synonym list, a "weight" synonym list, a "model number" synonym list, and so forth.

In the example embodiment, the target content detection module 240 identifies the type, category, or class of product associated with the content page, selects the set of synonym lists associated with that type, category, or class of product, and applies those synonym lists to the content page. In some embodiments, the class of product may be provided to the target content detection module 240 (e.g., by an analyst). In other embodiments, the class of product may be automatically determined by the target content detection module 240 through inspection of metadata associated with the content page, or derived from a category "breadcrumb" on the page (e.g., identifying a location within a hierarchy of a web site from which the content page originated, such as "consumer goods, household appliances, kitchen, refrigerators"). In still other embodiments, no type, category, or class determination is made.

The target content detection module 240 applies target content synonym lists to the content page in order to detect target content, as well as to determine the type of product data of that target content. In some embodiments, this comparison may be performed to HTML of the content page. In other embodiments, this comparison may be performed to the DOM of the content page. For example, presume the content page is associated with a book, and the target content detection module 240 has selected a "price" synonym list including {"price", "px", "cost"} and an "author" synonym list including {"author", "writer", "by", "written by"}. Further presume that the content page includes, among other content, the following portion of HTML (or DOM) content:

```
(1)  <div id="price_feature_div" class="feature" data-feature-name="price">
        <div id="price" class="a-section a-spacing-small">
          <table class="a-lineitem">
            <tbody>
(5)         <tr> ...
              <tr id="priceblock_ourprice_row">
                <td id="priceblock_ourprice_lbl" class="a-color-secondary a-size-base a-text-right a-nowrap">Price:</td>
                <td class="a-span12">
(10)              <span id="priceblock_ourprice" class="a-size-medium a-color-price">$229.99</span>
                  <span id="dealprice_shippingmessage" class="a-size-medium">...
                </td>
                ...
              </tr>
              ....
```

The target content detection module 240 applies each selected synonym list to the target content (e.g., including the example portion of target content above). If an element matches one or more of the terms in one of the synonym lists, that element is identified as a "target content item" and, more specifically, is associated with the data type of the synonym list it matched. The target content extraction module 250 then analyzes each of the target content items identified by the target content detection module 240 in order to determine a "value" associated with the target content item. In other words, and for example, the "price" target content item has been identified as such, but the actual price of the product (i.e., the "value" associated with this target content item) is then determined from analysis of the target content item (e.g., the element).

For example, in one embodiment, the target content detection module 240 may identify the term "Price" (e.g., from a "price" synonym list) within the user-visible portion of an element, or "key element", or the content between the "td" tag opening and "/td" closing (e.g., in the above HTML at lines 7-8). The target content detection module 240 determines that the term "Price" appeared as an element within a table (or list), and subsequently examines a neighboring or sibling element of the table for the value associated with the price, which appears in the next element (e.g., at lines 10-11). As such, the value "229.99" is extracted as the "price" for the target product.

In another embodiment, the term "priceblock_ourprice" (e.g., from a "price" synonym list) may be identified within the element tag (e.g., at line 10), and the value is presented in that same element, within the user-visible portion of the element, or the content between that element's opening "<span>" and closing "</span>" tag. As such, the value "229.99" is extracted as the price for the target product. Accordingly, these examples demonstrate that the synonym lists may be applied to data within a tag, or data between tags, or any mix of both. As such, the target detection module 240 detects and identifies target content items (e.g., elements) associated with the selected synonym lists.

In some scenarios, multiple elements may trigger a particular synonym list. For example, the term "price" may appear within a table such as shown above, as well as incidentally within another non-noise field, such as the specification for the product (e.g., "This refrigerator is offered at a rock-bottom price."). In some embodiments, the target content extraction module 250 selects one of the multiple triggering elements based on a position of the element (e.g., relative to the others, or relative to the content page). For example, the actual "price" field typically appears on the top half, or top-left, of content pages. As such, when multiple price elements are identified, the most upper element may be selected for use as the price, while the other is ignored.

In some embodiments, the target content extraction module 250 ignores elements for which the value cannot be determined (e.g., the "rock-bottom price" element may not have had associated data that was formatted like a $999.99 price, and is thus ignored in favor of the other, which was identified as "$229.99", matching the expected format). In some embodiments, the first element encountered for that synonym list is the element that is used. In some scenarios, the synonym list may trigger multiple times on a particular element. For example, if "price" and "priceblock_ourprice" are both in the price synonym list, then the above example would have triggered two occurrences in the above table example, where the "rock-bottom price" element would have triggered that synonym list once. Accordingly, in some embodiments, the target content extraction module 250 selects the element having the most triggered occurrences of the synonym list.

Once each target content item has been processed by the target content extraction module 250, the results can be described as a product data component, or a data pairing for each target content item: (<target field type>, <target value>), where <target field type> is an identifier indicating the type of data, and where <target value> is the data value identified for that field by the target content extraction module 250 (e.g., (price, $7.99), (title, "The Hobbit"), (author, "J. R. R. Tolkien"), etc.).

In some embodiments, the target content extraction module 250 also identifies one or more product data fields for which it does not have a synonym list, and identifies both the key for that data field and the associated value. For example, presume no synonym list exists for "Weight" (e.g., of a refrigerator), and further presume that the above HTML example includes an additional row within the same table:

| | |
|---|---|
| (15) | \<tr id="weightblock_row"\> |
| | \<td id="weightblock_lbl" class= "a-color-secondary a-size-base a-text-right a-nowrap"\>Weight:\</td\> |
| | \<td class= "a-span12"\> |
| | \<span id="weightblock_weight" class="a-size-medium |
| (20) | a-color-weight"\>325 pounds\</span\> |
| | \</td\> |
| | \</tr\> |

In the example embodiment, the target content extraction module 250 determines that some rows of the table (or list) match on one or more synonym lists (e.g., like the above "price" row), but one or more other rows within the same table do not get identified by any of the synonym lists applied to the content page.

This scenario represents a situation in which some product data is identified (e.g., price), but other data is present that was not identified, but that may be product data (e.g., weight). As such, the target content extraction system 250 extracts both a term or key (e.g., "weight", "weightblock_weight", or both) and an associated value (e.g., "325 pounds"). In some embodiments, the target content extraction system 250 may store this new data for analysis by a user, such as a data analyst. In other embodiments, the target content extraction system 250 may automatically create a new synonym list (e.g., weight) with the determined synonyms (e.g., "weight" and "weightblock_weight"), store the new value data for the current content page, and subsequently automatically apply this new synonym list to other content pages. As such, synonym lists are automatically determined and extracted based on data occurring within the content page, in proximity or relationship to other known types of product data.

In some embodiments, content detection and analysis may be done after noise content extraction, as described above. In other embodiments, content detection and analysis may be done without any noise content extraction.

As such, the content extraction engine 150 processes many content pages and extracts target values for a set of target field types (e.g., product data components). The pruning of noise content using, for example, the noise synonym lists facilitates removal of content prior to processing those sections or elements for target content (e.g., by the target content detection module 240). As such, the content extraction engine 150 speeds up the operation of the computer and reduces the amount of compute processing required to analyze content pages. Further, the noise removal improves upon the results of the overall target content detection and analysis by removing some potentially false positives that may otherwise occur (e.g., finding a "price" synonym within an advertisements section). The target content synonym lists processing (e.g., by the target content detection module 240) enables the content extraction system 150 to identify target content items (e.g., HTML elements associated with particular target field types) from within the content page and parse from the target content items the value associated with that target field type.

As used herein, the term "section" is used to refer to a portion of the content page. Various web markup languages such as HTML define a structure or language that enables the web developer to build content pages in pieces (e.g., HTML elements), and each of those pieces are interpreted or processed (e.g., displayed) by the user's web browser. Further, markup languages such as HTML enable users to "nest" elements within other elements. As used herein, the term "section" is used to refer to a portion of the content page as defined by one of those pieces. For example, the content page may have an element defining a header section in which logos and buttons appear, or an element defining a navigation section, or an advertising section, or a footer section, or a product content section. Various commonly provided sections are described herein, particularly with respect to FIGS. 3 and 4 below.

Figure 3:
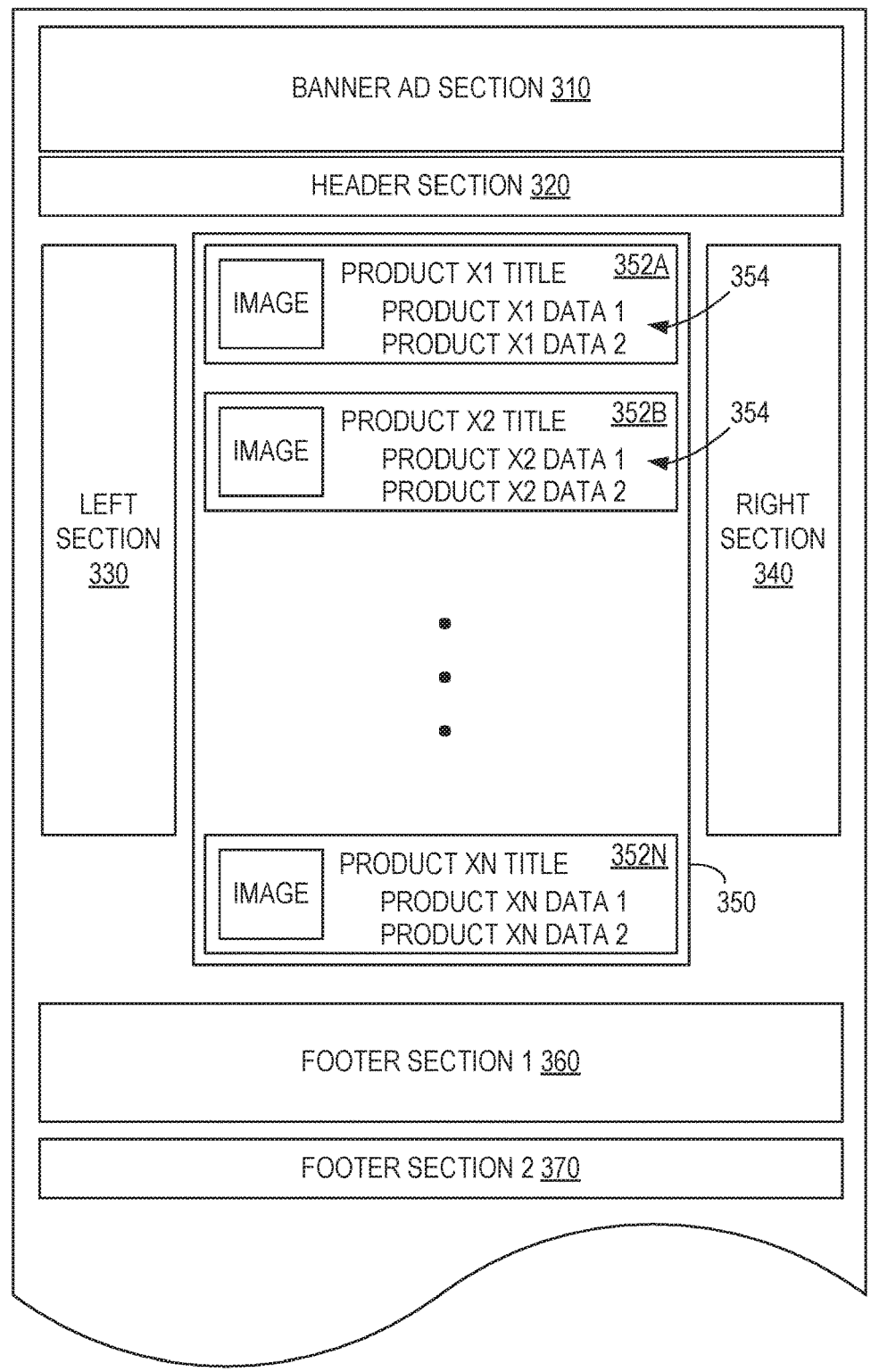
FIG. 3 is a diagram illustrating an example content page and, more specifically, a listings page.

FIG. 3 is a diagram illustrating an example content page and, more specifically, a listings page 300. In the example embodiment, the listings page 300 is provided by the publication system 130 to the content extraction engine 150, such as in answer to an HTTP request to the content server 134. Content pages such as the listings page 300 are often provided as a page of data (sometimes referred to herein as "source code") in a markup language such as HTML. As described above, many processing steps associated with the content extraction engine 150 operate on the source code of content pages such as the listings page 300 (e.g., without necessarily rendering the source code to present the listings page 300 in the form shown in FIG. 3), while other processing steps associated with the content extraction engine 150 do render the content pages to further those steps (e.g., as described above regarding the user interface module 220). It should be understood that the listings page 300 is illustrated in FIG. 3 as it would be rendered or displayed to a user such as the user 106 if viewed through a web browser (e.g., interpreting HTML content of the listings page 300) for purposes of illustration and discussion.

The listings page 300 may be, for example, the results of a search query executed by the publication system 130 (e.g., in response to a search request submitted to the content server 134). Many publication systems 130 offer search query functionality or other site navigation functionality that enables the site's users to display a subset of products presented by the publication system 130. For example, the publication system 130 may offer a search query box in which a user may enter one or more search terms to define what types of products they are looking for, such as "refrigerator" to see listings or product data for refrigerator appliances, or "The Hobbit" to see listings or product data associated with the book of the same title.

The listings page 300 includes a banner ad section 310, a header section 320, a left section 330, a right section 340, a listings results section 350, a footer section 360, and a second footer section 370. It should be understood that many different types of sections and formatting of content pages are possible, and that the content page shown in FIG. 3 is one example. In the example shown in FIG. 3, the listings results section 350 is the only section that contains target product data (e.g., data associated directly with the query that is the primary object of the listings page 300). Many of the other sections, such as the banner ad section 310, the header section 320, and the footer sections 360 and 370 may be provided on any of the site's content pages (e.g., regardless of the particular search). In other words, these sections 310, 320, 360, and 370 are not associated with the products shown in the listings results section 350, do not contain any product data associated with those products, and as such as noise sections. Other sections, such as the left section 330 and the right section 340, may have their contents changed based on, for example, the nature of the search, or other site-specific or session-specific variables, but in this example, these sections also do not contain any target product data associated with the products shown in the listings results section 350, and as such are also noise sections.

As mentioned above, the listings results section 350 is the only target content section shown in this example. The listings results section 350 includes N product listings 352A, 352B, . . . , 352N (collectively, product listings 352). Each product listing 352 includes one or more product data components 354. For example, product listing 352A includes "PRODUCT X1 TITLE" (e.g., the name of a particular refrigerator, such as "FridgeCo Model X1"), "PRODUCT X1 DATA 1" (e.g., an offered sale price of the refrigerator, such as "$599.99"), "PRODUCT X1 DATA 2" (e.g., shipping information associated with the refrigerator listing, such as "free shipping"), and "IMAGE" (e.g., a thumbnail photo of the refrigerator, such as an image file "fridgeco_X1_thumbnail.jpg"). Each of these product data components 354 represent target data associated with products that are within the scope of the listings page 300, and are thus potential target content to be detected and analyzed by the content extraction engine 150 as described herein.

During operation, and as described above with respect to FIG. 2, the content extraction engine 150 receives the listings page 300 (e.g., by the page acquisition module 210) and prunes the noise content from the content page. In other words, sections 310, 320, 330, 340, 360, and 370 are identified as noise sections and are removed from the content page (e.g., by the noise content pruning module 230). The content extraction engine 150 then performs content detection and analysis on the remaining content sections. In other words, section 350 is processed for target content. Accordingly, and continuing one of the above examples, the content extraction engine 150 generates the following product data components from the product listing 350A: (title, "FridgeCo Model X1"); (price, "$599.99"); (shipping, "free shipping"); (image, file: "fridgeco_X1_thumbnail.jpg"), and so forth.

Figure 4:
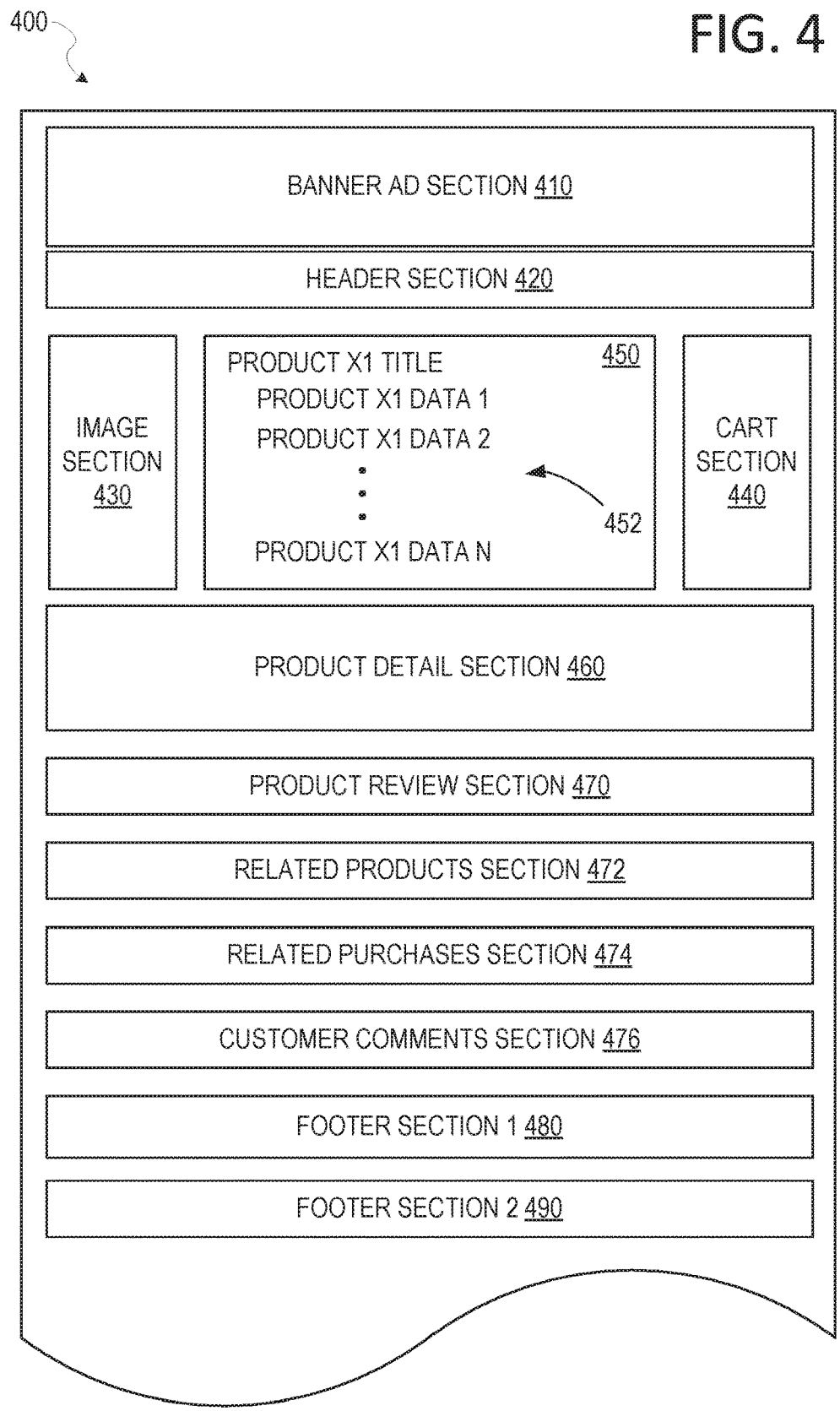
FIG. 4 is a diagram illustrating an example content page and, more specifically, a product detail page.

FIG. 4 is a diagram illustrating an example content page and, more specifically, a product detail page 400. In the example embodiment, the product detail page 400 is provided by the publication system 130 to the content extraction engine 150, such as in answer to an HTTP request to the content server 134. Similar to the listings page, it should be understood that the product detail page 400 is illustrated in FIG. 4 as it would be rendered or displayed to a user such as the user 106 if viewed through a web browser (e.g., interpreting HTML content of the listings page 300) for purposes of illustration and discussion.

The product detail page 400 may be, for example, the user 106 requesting display of product details on a specific product (e.g., clicking on a link provided in the listings page 300 for the FridgeCo refrigerator listing 350A). Many publication systems 130 offer product detail pages that enables the site's users to display product data (e.g., product data components) associated with a particular target product.

The product detail page 400 includes a banner ad section 410, a header section 420, an image section 430, a cart section 440, a product information section 450, a product details section 460, a related products section 472, a related purchases section 474, a customer comments section 476, a first footer section 480, and a second footer section 490. It should be understood that many different types of sections and formatting of content pages are possible, and that the content page shown in FIG. 4 is one example. In the example shown in FIG. 4, the image section 430, the product information section 450, the product detail section 460, and the product review section 470 contain target product data (e.g., data associated directly with the product that is the primary object of the product detail page 400). In some embodiments, the customer comments section 476 may also be considered target product data, as the information specific to the target product (e.g., by prior purchasers of the product). Many of the other sections, such as the banner ad section 410, the header section 420, cart section 440, and the footer sections 480 and 490 may be provided on any of the site's content pages (e.g., regardless of the particular search). In other words, these sections 410, 420, 440, 480, and 490 are not directly associated with the target product, do not contain any product data associated with that product, and as such as noise sections. Other sections, such as related products section 472, related purchases section 474, may have their contents changed based on the particular target product, but in this example, these sections also do not contain any target product data associated with the products shown in the product detail page 400, and as such are also noise sections.

As mentioned above, the image section 430, the product information section 450, the product detail section 460, and the product review section 470 are target content sections. The product information section 450 includes one or more product data components 452. For example, the product information section 450 includes "PRODUCT X1 TITLE" (e.g., the name of a particular refrigerator, such as "FridgeCo Model X1"), "PRODUCT X1 DATA 1" (e.g., an offered sale price of the refrigerator, such as "$599.99"), "PRODUCT X1 DATA 2" (e.g., shipping information associated with the refrigerator listing, such as "free shipping"), and so forth. The product detail section 460 also contains additional product data components (not separately shown), as may the product review section 470. The image section 430 also contains one or more images of the target product (e.g., a larger photo(s) of the refrigerator, such as an image file "fridgeco_X1_fullsize.jpg"), which are also product data components. Each of these product data components within the target content sections 430, 450, 460 include target data associated with the target product that is within the scope of the product detail page 400, and are thus potential target content to be detected and analyzed by the content extraction engine 150 as described herein.

During operation, and as described above with respect to FIG. 2, the content extraction engine 150 receives the product detail page 400 (e.g., by the page acquisition module 210) and prunes the noise content from the content page. In other words, sections 410, 420, 440, 472, 474, 478, 480, and 490 are identified as noise sections and are removed from the content page (e.g., by the noise content pruning module 230). The content extraction engine 150 then performs content detection and analysis on the remaining content sections. In other words, sections 430, 450, 460 are processed for target content. Accordingly, and continuing one of the above examples, the content extraction engine 150 generates the following product data components from the product listing 350A: (title, "FridgeCo Model X1"); (price, "$599.99"); (shipping, "free shipping"); (image, file: "fridgeco_X1_large.jpg"), and so forth.

Figure 5A:
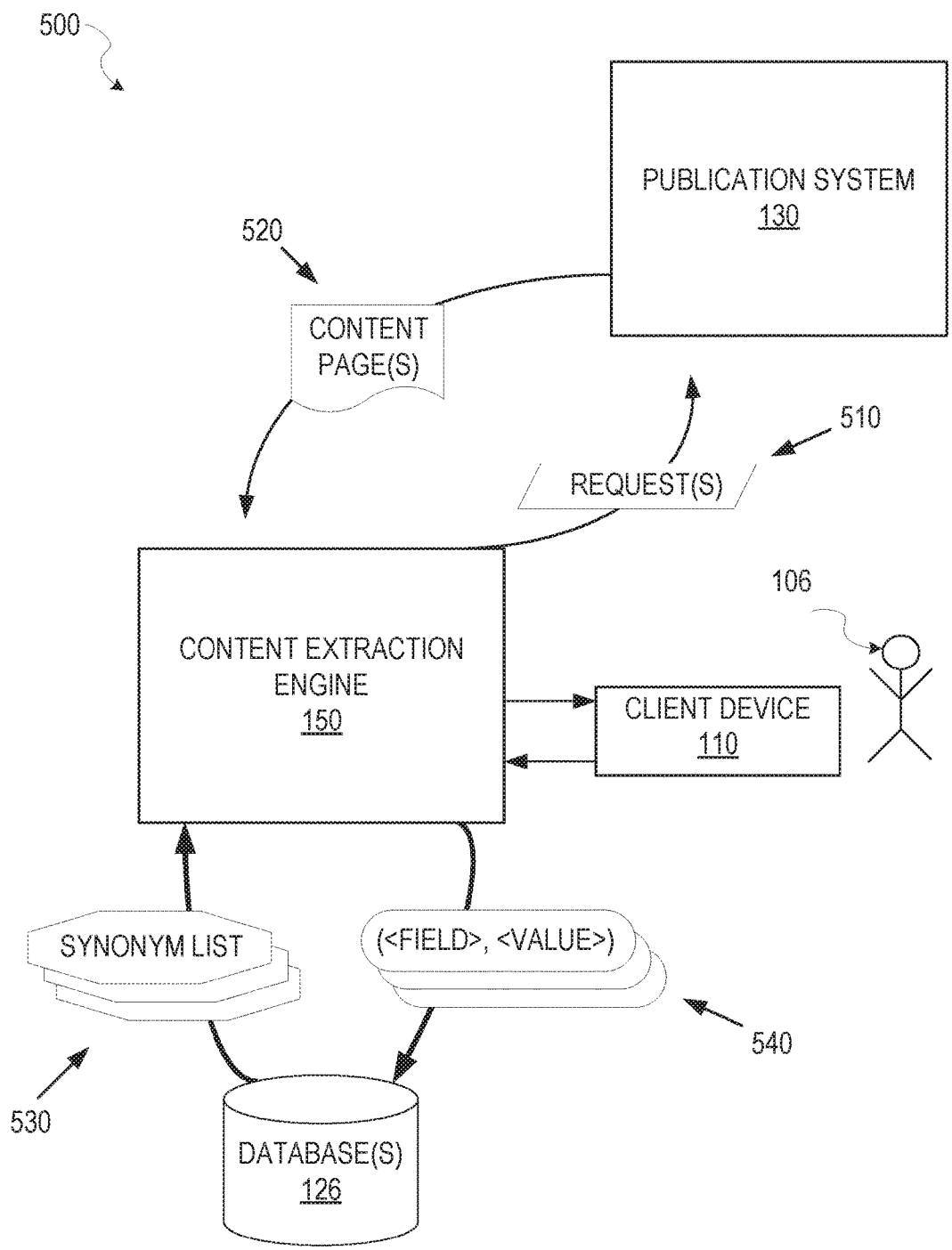
FIGS. 5A and 5B illustrate an example content extraction system for extracting content from content pages.

FIG. 5A is an example content extraction system 500 for extracting content from content pages 520. In some embodiments, the content extraction system 500 is similar to the content extraction system 100, and content pages 520 are similar to the listings page 300 or the product details page 400. The content extraction system 500 includes the publication system 130, the client device 110, and the content extraction engine 150, all in networked communication (e.g., via the Internet, or a private computer network).

During operation, the content extraction engine 150 transmits requests 510 for product content pages to the publication system 130. In response, the publication system 130 responds by sending content pages 520 such as the listings page 300 or the product details page 400 to the content extraction engine 150 (e.g., one page 520 per request 510). The content extraction engine 150 processes the content pages 520 as described herein.

Figure 5B:
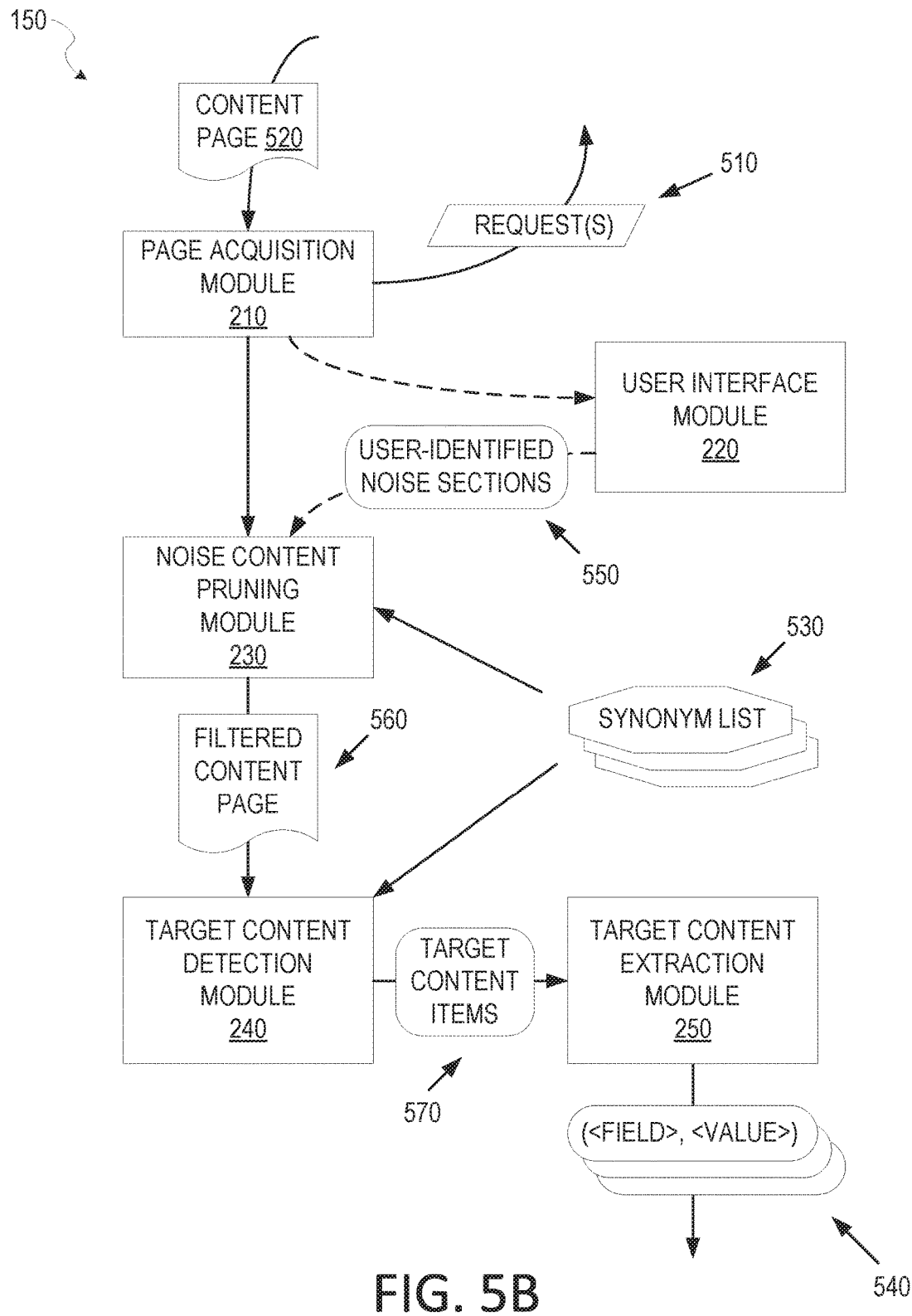

More specifically, FIG. 5B illustrates a data flow of operations between modules of the content extraction system 150 in an example embodiment. The page acquisition module 210 receives the content page 520 from the publication system 130. In some embodiments, the page acquisition module 210 engages the user interface module 220, which enables the user 106 to identify one or more noise sections, or "user identified noise sections" 550 (e.g., via client device 110). The noise content pruning module 230 receives the content page 520 and, optionally, an indication of the user-identified noise sections 550 within the content page 520. Further, the noise content pruning module 230 retrieves one or more synonym lists 530 with which the pruning module 230 performs the pruning of noise content sections as described herein to generate a filtered content page 560 (e.g., the content page 520 with the user-identified noise sections 550 and other automatically identified noise sections removed).

The filtered content page 560 is then transferred to the target content detection module 240. The target content detection module 240 also retrieves one or more synonym lists 530 for use in detecting target content items 570 as described herein. Once identified, the target content items 570 and filtered content page 560 are passed to the target content extraction module 250. The extraction module 250 extracts the target product data from each target content item 570 and provides the resulting product data components 540 for use, such as by storing in the database 126. In some embodiments, this extracted product data may be used to build a product catalog, or a searchable database of products, that provides the extracted product data to users. In some embodiments, the content extraction system 150 may provide product comparisons (e.g., price comparisons) between multiple vendors' listings. In some embodiments, the extracted content may be used for data mining and business intelligence.

Figure 6:
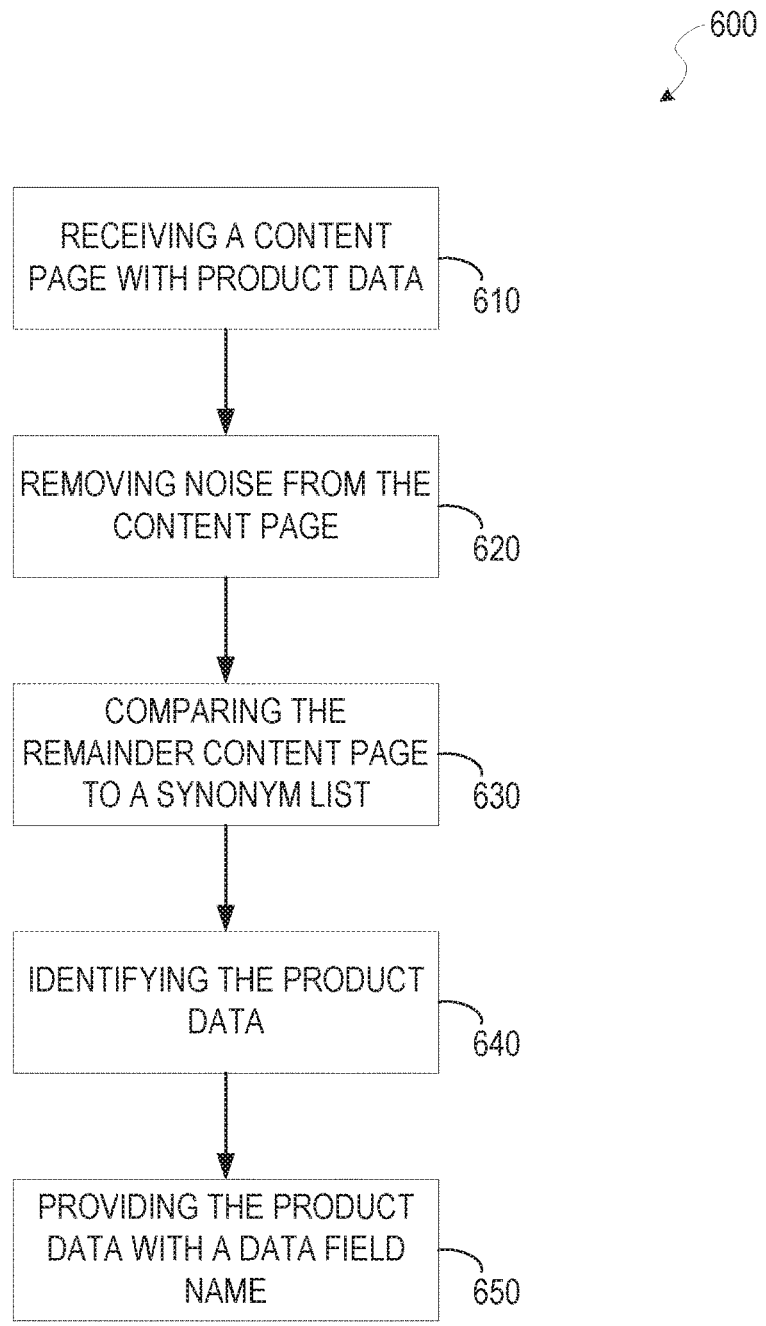
FIG. 6 is a diagram of an example method for extracting product content from content pages such as the listings page shown in FIG. 3 or the product details page shown in FIG. 4.

FIG. 6 is a diagram of an example method 600 for extracting product content from content pages such as the listings page 300 or the product details page 400. In the example embodiment, the method 600 is performed by a computing device including a processor and memory which may be similar to the content extraction engine 150 or a machine 800, or by a software architecture. In operation 610, the method includes receiving a content page including first product data for a target product. In operation 620, the method includes removing noise content from the content page, thereby generating a remainder content page. In some embodiments, removing noise content further includes comparing the content page to a second synonym list. In some embodiments, the method includes displaying the content page to a user through a graphical user interface and enabling the user to select a first section of the content page, wherein removing noise content from the content page further includes removing the first section from the content page.

At operation 630, the method includes comparing, by the processor, the remainder content page to a first synonym list to identify the first product data at operation 640, the first synonym list including a first data field name In some embodiments, the first synonym list includes a plurality of synonyms associated with the first data field name, wherein a first element of the content page includes the first product data, and comparing the remainder content page to the first synonym list further includes locating a synonym of the first synonym list within the first element, thereby identifying the first product data. In some embodiments, the content page includes a plurality of hypertext markup language (HTML) elements including a first element including a first tag having tag data, and comparing the remainder content page to the first synonym list further includes comparing the first synonym list to the tag data, thereby identifying the first element as associated with the first product data and identifying the first product data within the first element. Further, the operation identifying the first product data within the first element may include identifying the first product data within the first tag.

In some embodiments, the content page includes second product data associated with the target product, and the method further includes identifying the second product data based on a relationship to the first product data within the content page, extracting a new synonym associated with the second product data from the content page, and generating a second synonym list including the new synonym.

At operation 650, the method includes providing the first product data as associated with the first data field name.

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

The modules, methods, applications and so forth described in conjunction with FIGS. 1-6 are implemented in some embodiments in the context of a machine and an associated software architecture. The sections below describe representative software architecture(s) and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things." While yet another combination produces a server computer for use within a cloud computing architecture. Not all combinations of such software and hardware architectures are presented here as those of skill in the art can readily understand how to implement the invention in different contexts from the disclosure contained herein.

Figure 7:
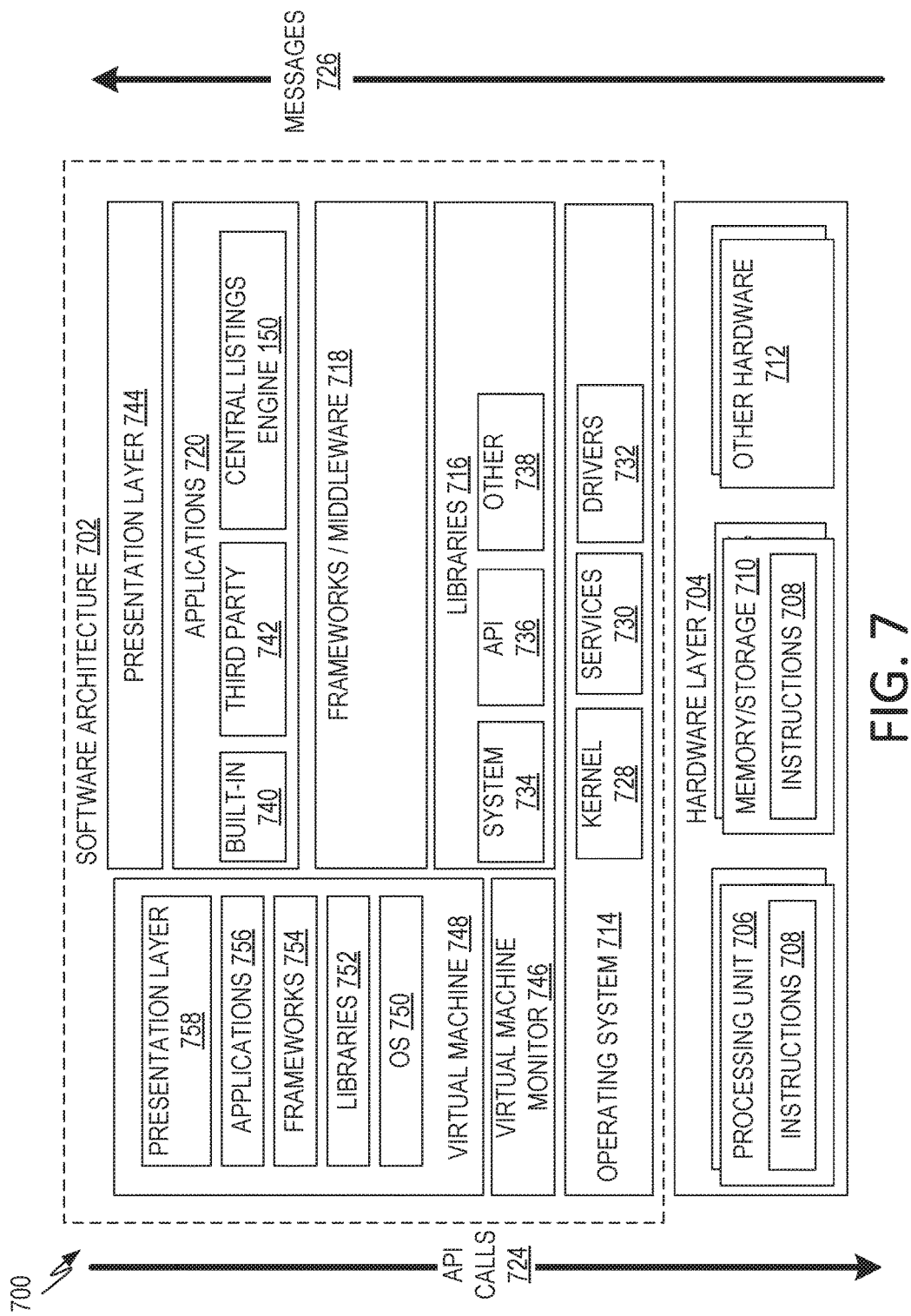
FIG. 7 is a block diagram illustrating a representative software architecture, which may be used in conjunction with various hardware architectures herein described.

FIG. 7 is a block diagram 700 illustrating a representative software architecture 702, which may be used in conjunction with various hardware architectures herein described. FIG. 7 is merely a non-limiting example of a software architecture and it will be appreciated that many other architectures may be implemented to facilitate the functionality described herein. The software architecture 702 may be executing on hardware such as machine 800 of FIG. 8 that includes, among other things, processors 810, memory 830, and I/O components 850. A representative hardware layer 704 is illustrated and can represent, for example, the machine 800 of FIG. 8. The representative hardware layer 704 comprises one or more processing units 706 having associated executable instructions 708. Executable instructions 708 represent the executable instructions of the software architecture 702, including implementation of the methods, modules and so forth of FIGS. 1-6. Hardware layer 704 also includes memory or storage modules 710, which also have executable instructions 708. Hardware layer 704 may also comprise other hardware as indicated by 712 which represents any other hardware of the hardware layer 704, such as the other hardware illustrated as part of machine 800.

In the example architecture of FIG. 7, the software 702 may be conceptualized as a stack of layers where each layer provides particular functionality. For example, the software 702 may include layers such as an operating system 714, libraries 716, frameworks/middleware 718, applications 720 and presentation layer 622. Operationally, the applications 720 or other components within the layers may invoke application programming interface (API) calls 724 through the software stack and receive a response, returned values, and so forth illustrated as messages 726 in response to the API calls 724. The layers illustrated are representative in nature and not all software architectures have all layers. For example, some mobile or special purpose operating systems may not provide a frameworks/middleware layer 718, while others may provide such a layer. Other software architectures may include additional or different layers.

The operating system 714 may manage hardware resources and provide common services. The operating system 714 may include, for example, a kernel 728, services 730, and drivers 732. The kernel 728 may act as an abstraction layer between the hardware and the other software layers. For example, the kernel 728 may be responsible for memory management, processor management (e.g., scheduling), component management, networking, security settings, and so on. The services 730 may provide other common services for the other software layers. The drivers 732 may be responsible for controlling or interfacing with the underlying hardware. For instance, the drivers 732 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 716 may provide a common infrastructure that may be utilized by the applications 720 or other components or layers. The libraries 716 typically provide functionality that allows other software modules to perform tasks in an easier fashion than to interface directly with the underlying operating system 714 functionality (e.g., kernel 728, services 730 or drivers 732). The libraries 716 may include system 734 libraries (e.g., C standard library) that may provide functions such as memory allocation functions, string manipulation functions, mathematic functions, and the like. In addition, the libraries 716 may include API libraries 736 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 716 may also include a wide variety of other libraries 738 to provide many other APIs to the applications 720 and other software components/modules.

The frameworks 718 (also sometimes referred to as middleware) may provide a higher-level common infrastructure that may be utilized by the applications 720 or other software components/modules. For example, the frameworks 718 may provide various graphic user interface (GUI) functions, high-level resource management, high-level location services, and so forth. The frameworks 718 may provide a broad spectrum of other APIs that may be utilized by the applications 720 or other software components/modules, some of which may be specific to a particular operating system or platform.

The applications 720 includes built-in applications 740 or third party applications 742. Examples of representative built-in applications 740 may include, but are not limited to, a contacts application, a browser application, a book reader application, a location application, a media application, a messaging application, or a game application. Third party applications 742 may include any of the built in applications as well as a broad assortment of other applications. In a specific example, the third party application 742 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 742 may invoke the API calls 724 provided by the mobile operating system such as operating system 714 to facilitate functionality described herein.

The applications 720 may utilize built in operating system functions (e.g., kernel 728, services 730 or drivers 732), libraries (e.g., system 734, APIs 736, and other libraries 738), frameworks/middleware 718 to create user interfaces to interact with users of the system. Alternatively, or additionally, in some systems interactions with a user may occur through a presentation layer, such as presentation layer 744. In these systems, the application/module "logic" can be separated from the aspects of the application/module that interact with a user.

Some software architectures utilize virtual machines. In the example of FIG. 7, this is illustrated by virtual machine 748. A virtual machine creates a software environment where applications/modules can execute as if they were executing on a hardware machine (such as the machine of FIG. 8, for example). A virtual machine is hosted by a host operating system (operating system 714 in FIG. 7) and typically, although not always, has a virtual machine monitor 746, which manages the operation of the virtual machine as well as the interface with the host operating system (i.e., operating system 714). A software architecture executes within the virtual machine such as an operating system 750, libraries 752, frameworks/middleware 754, applications 756 or presentation layer 758. These layers of software architecture executing within the virtual machine 748 can be the same as corresponding layers previously described or may be different.

In the example embodiment, the content extraction engine 150 operates as an application in the applications 720 layer. However, in some embodiments, the content extraction engine 150 may operate in other software layers, or in multiple software layers (e.g., framework 718 and application 720), or in any architecture that enables the systems and methods as described herein.

Figure 8:
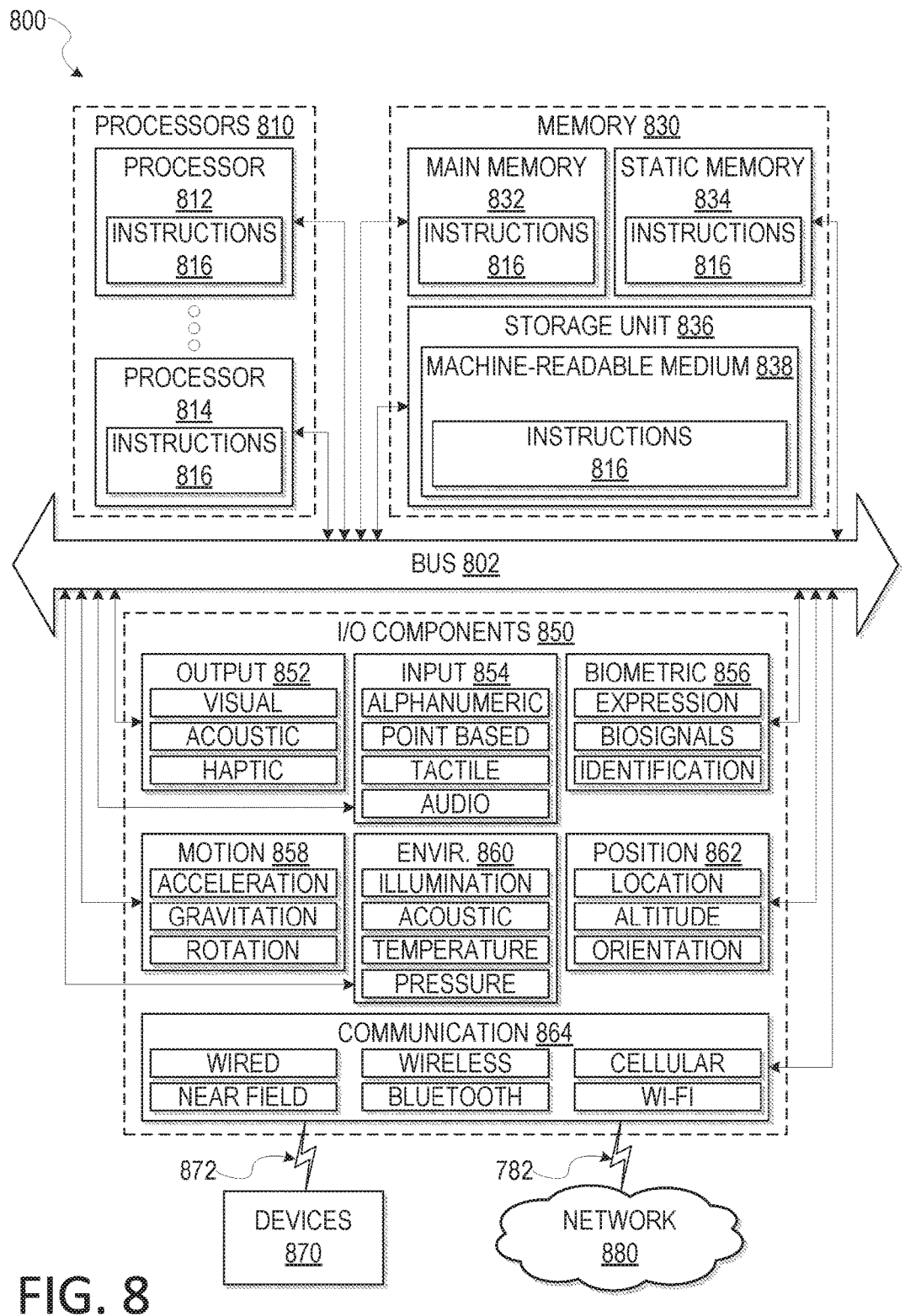
FIG. 8 is a block diagram illustrating components of a machine, according to some example embodiments, able to read instructions from a machine-readable medium (e.g., a machine-readable storage medium) and perform any one or more of the methodologies discussed herein.

FIG. 8 is a block diagram illustrating components of a machine 800, according to some example embodiments, able to read instructions from a machine-readable medium (e.g., a machine-readable storage medium) and perform any one or more of the methodologies discussed herein. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. For example the instructions may cause the machine to execute the flow diagrams of FIG. 6. Additionally, or alternatively, the instructions may implement the user interactions module 210, external site communications module 220, graphing module 230, community analysis module 240, and bidding module 250, and so forth. The instructions transform the general, non-programmed machine into a particular machine programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by machine 800. Further, while only a single machine 800 is illustrated, the term "machine" shall also be taken to include a collection of machines 800 that individually or jointly execute the instructions 816 to perform any one or more of the methodologies discussed herein.

The machine 800 may include processors 810, memory 830, and I/O components 850, which may be configured to communicate with each other such as via a bus 802. In an example embodiment, the processors 810 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 812 and processor 814 that may execute instructions 816. The term "processor" is intended to include multi-core processor that may comprise two or more independent processors (sometimes referred to as "cores") that may execute instructions contemporaneously. Although FIG. 8 shows multiple processors, the machine 800 may include a single processor with a single core, a single processor with multiple cores (e.g., a multi-core process), multiple processors with a single core, multiple processors with multiples cores, or any combination thereof.

The memory/storage 830 may include a memory 832, such as a main memory, or other memory storage, and a storage unit 836, both accessible to the processors 810 such as via the bus 802. The storage unit 836 and memory 832 store the instructions 816 embodying any one or more of the methodologies or functions described herein. The instructions 816 may also reside, completely or partially, within the memory 832, within the storage unit 836, within at least one of the processors 810 (e.g., within the processor's cache memory), or any suitable combination thereof, during execution thereof by the machine 800. Accordingly, the memory 832, the storage unit 836, and the memory of processors 810 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) or any suitable combination thereof. The term "machine-readable medium" should be taken to include a single medium or multiple media (e.g., a centralized or distributed database, or associated caches and servers) able to store instructions 816. The term "machine-readable medium" shall also be taken to include any medium, or combination of multiple media, that is capable of storing instructions (e.g., instructions 816) for execution by a machine (e.g., machine 800), such that the instructions, when executed by one or more processors of the machine 800 (e.g., processors 810), cause the machine 800 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes transitory signals per se.

The I/O components 850 may include a wide variety of components to receive input, provide output, produce output, transmit information, exchange information, capture measurements, and so on. The specific I/O components 850 that are included in a particular machine will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion and the grouping is in no way limiting. In various example embodiments, the I/O components 850 may include output components 852 and input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 854 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location or force of touches or touch gestures, or other tactile input components), audio input components (e.g., a microphone), and the like.

In further example embodiments, the I/O components 850 may include biometric components 856, motion components 858, environmental components 860, or position components 862 among a wide array of other components. For example, the biometric components 856 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 858 may include acceleration sensor components (e.g., accelerometer), gravitation sensor components, rotation sensor components (e.g., gyroscope), and so forth. The environmental components 860 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 862 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 850 may include communication components 864 operable to couple the machine 800 to a network 880 or devices 870 via coupling 882 and coupling 872 respectively. For example, the communication components 864 may include a network interface component or other suitable device to interface with the network 880. In further examples, communication components 864 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 870 may be another machine or any of a wide variety of peripheral devices (e.g., a peripheral device coupled via a Universal Serial Bus (USB)).

Moreover, the communication components 864 may detect identifiers or include components operable to detect identifiers. For example, the communication components 864 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 864, such as, location via Internet Protocol (IP) geo-location, location via Wi-Fi® signal triangulation, location via detecting a NFC beacon signal that may indicate a particular location, and so forth.

In various example embodiments, one or more portions of the network 880 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network and the coupling 882 may be a Code Division Multiple Access (CDMA) connection, a Global System for Mobile communications (GSM) connection, or other type of cellular or wireless coupling. In this example, the coupling 882 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 816 may be transmitted or received over the network 880 using a transmission medium via a network interface device (e.g., a network interface component included in the communication components 864) and utilizing any one of a number of well-known transfer protocols (e.g., hypertext transfer protocol (HTTP)). Similarly, the instructions 816 may be transmitted or received using a transmission medium via the coupling 872 (e.g., a peer-to-peer coupling) to devices 870. The term "transmission medium" shall be taken to include any intangible medium that is capable of storing, encoding, or carrying instructions 816 for execution by the machine 800, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The invention claimed is:

1. A system comprising:
a content extraction engine comprising at least one processor and configured to:
receive a content page including first product data for a target product, the content page being configured to enable the target product to be offered for sale on an e-commerce site on the Internet;
remove noise content from the content page, thereby generating a remainder content page, the noise content pertaining to data unrelated to the target product, the remainder content page containing target product data useable to enable product comparison between multiple vendors' listings;
compare the remainder content page to a first synonym list to identify the first product data, the first synonym list including a first data field name and including a list of words that may be used to identify a particular type of data for the target product;
provide the first product data as associated with the first data field name to a database, the first product data being configured to enable performance comprising providing product comparisons between multiple vendors' listings.

2. The system of claim 1, wherein the operation to remove noise content from the content page comprises comparing the content page to a second synonym list.

3. The system of claim 1, wherein the first synonym list includes a plurality of synonyms associated with the first data field name, wherein a first element of the content page includes the first product data, wherein the content extraction engine is further configured to locate a synonym of the first synonym list within the first element, thereby identifying the first product data.

4. The system of claim 1, wherein the content page includes a plurality of hypertext markup language (HTML) elements including a first element including a first tag having tag data, wherein the content extraction engine is further configured to:
compare the first synonym list to the tag data, thereby identifying the first element as associated with the first product data; and
identify the first product data within the first element.

5. The system of claim 4, wherein the operation identifying the first product data within the first element comprises identifying the first product data within the first tag.

6. The system of claim 1, wherein the at least one processor is further configured to use the first product data for data mining and business intelligence.

7. The system of claim 1, wherein the content extraction engine is further configured to:
display the content to a user through a graphical user interface; and
enable the user to select a first section of the content page, wherein removing noise content from the content page further includes removing the first section from the content page.

8. The system of claim 1, wherein the content page includes second product data associated with the target product, the content extraction system further configured to:
identify the second product data based on a relationship to the first product data within the content page;
extract a new synonym associated with the second product data from the content page;
generate a second synonym list including the new synonym.

9. A computer-implemented method for extracting content from a content page, the method is performed by a processor, the method comprising:
receiving a content page including first product data for a target product, the content page being configured to enable the target product to be offered for sale on an e-commerce site on the Internet;
removing noise content from the content page, thereby generating a remainder content page, the noise content pertaining to data unrelated to the target product, the remainder content page containing target product data usable to enable product comparison between multiple vendors' listings;
comparing, by the processor, the remainder content page to a first synonym list to identify the first product data, the first synonym list including a first data field name and including a list of words that may be used to identify a particular type of data for the target product;
providing the first product data as associated with the first data field name to a database, the first product data being configured to enable performance comprising providing product comparisons between multiple vendors' listings.

10. The method of claim 9, wherein removing noise content further includes comparing the content page to a second synonym list.

11. The method of claim 9, wherein the first synonym list includes a plurality of synonyms associated with the first data field name, wherein a first element of the content page includes the first product data, wherein comparing the remainder content page to the first synonym list further includes locating a synonym of the first synonym list within the first element, thereby identifying the first product data.

12. The method of claim 9, wherein the content page includes a plurality of hypertext markup language (HTML) elements including a first element including a first tag having tag data, wherein comparing the remainder content page to the first synonym list further includes:
comparing the first synonym list to the tag data, thereby identifying the first element as associated with the first product data; and
identifying the first product data within the first element.

13. The method of claim 12, wherein the operation identifying the first product data within the first element comprises identifying the first product data within the first tag.

14. The method of claim 9 further comprising:
displaying the content page to a user through graphical user interface; and
enabling the user to select a first section of the content page, wherein removing noise content from the content page further includes removing the first section from the content page.

15. The method of claim 9, wherein the content page includes second product data associated with the target product, the method further comprising:
identifying the second product data based on a relationship to the first product data within the content page;
extracting a new synonym associated with the second product data from the content page;
generating a second synonym list including the new synonym.

16. A non-transitory machine-readable storage medium storing a set of instructions that, when executed by at least one processor, causes the at least one processor to perform operations comprising:
receiving a content page including first product data for a target product, the content page being configured to enable the target product to be offered for sale on an e-commerce site on the Internet;
removing noise content from the content page, thereby generating a remainder content page, the noise content pertaining to data unrelated to the target product, the remainder content page containing target product data usable to enable product comparison between multiple vendors' listings;
comparing the remainder content page to a first synonym list to identify the first product data, the first synonym list including a first data field name and including a list of words that may be used to identify a particular type of data for the target product;
providing the first product data as associated with the first data field name to a database, the first product data being configured to enable performance comprising providing product comparisons between multiple vendors' listings.

17. The machine-readable medium of claim 16, wherein removing noise content further includes comparing the content page to a second synonym list.

18. The machine-readable medium of claim 16, wherein the first synonym list includes a plurality of synonyms associated with the first data field name, wherein a first element of the content page includes the first product data, wherein the comparing the remainder content page to the first synonym list further includes locating a synonym of the first synonym list within the first element, thereby identifying the first product data.

19. The machine-readable medium of claim 16, wherein the content page includes a plurality of hypertext markup language (HTML) elements including a first element including a first tag having tag data, wherein the comparing the remainder content page to the first synonym list further includes comparing the first synonym list to the tag data, thereby identifying the first product data within the first tag.

20. The machine-readable of claim 16, wherein the content page includes second product data associated with the target product, the operations further comprising:
identifying the second product data based on a relationship to the first product data within the content page;
extracting a new synonym associated with the second product data from the content page;
generating a second synonym list including the new synonym.

* * * * *